United States Patent

Sandoval et al.

[15] 3,681,859
[45] Aug. 8, 1972

[54] ELECTROMECHANICAL BASE CONVERTER

[72] Inventors: Antonio A. Sandoval, 3744 Benton Boulevard, Kansas City, Mo. 64128; Donald J. Dunlavy, 5741 Grand, Kansas City, Mo. 64113

[22] Filed: Jan. 21, 1971

[21] Appl. No.: 108,505

[52] U.S. Cl...................................35/30, 235/155
[51] Int. Cl................................................G09b 19/02
[58] Field of Search.....................35/30, 32; 235/155

[56] References Cited

UNITED STATES PATENTS

| | | | |
|---|---|---|---|
| 2,868,450 | 1/1959 | Hemstreet | 235/155 |
| 3,162,960 | 12/1964 | Elmlinger | 35/30 |
| 3,482,331 | 12/1969 | Gazale | 35/30 |

Primary Examiner—Wm. H. Grieb
Attorney—Schmidt, Johnson, Hovey & Williams

[57] ABSTRACT

Instructional apparatus for representing numbers in a selected number system, normally other than the decimal system, and for indicating a given number in decimal form as well as the form into which it is converted by the apparatus. A master unit drives a series of identical slave unit modules, each of the slave units corresponding to one place of the number system. The master unit, under the control of a student or instructor, delivers a selected number of count pulses in serial fashion, such number being indicated by a decade counter on the master unit. The slave unit representing the units place counts the pulses and displays the number counted, and resets to zero after the units place fills. As the units place slave resets, it delivers a transfer command to a second slave unit representing the next higher order place. Successive transfer commands are counted and displayed by the second slave unit, which also resets after its place fills and delivers a transfer command to a third slave unit which operates in the same manner. As many slave units may be employed as dictated by the capacity desired. In each slave unit the counting function is executed by a stepper relay, and a base selector switch is provided so that the unit may be set to any one of several number systems, such as those of any base from 2 through 16.

11 Claims, 2 Drawing Figures

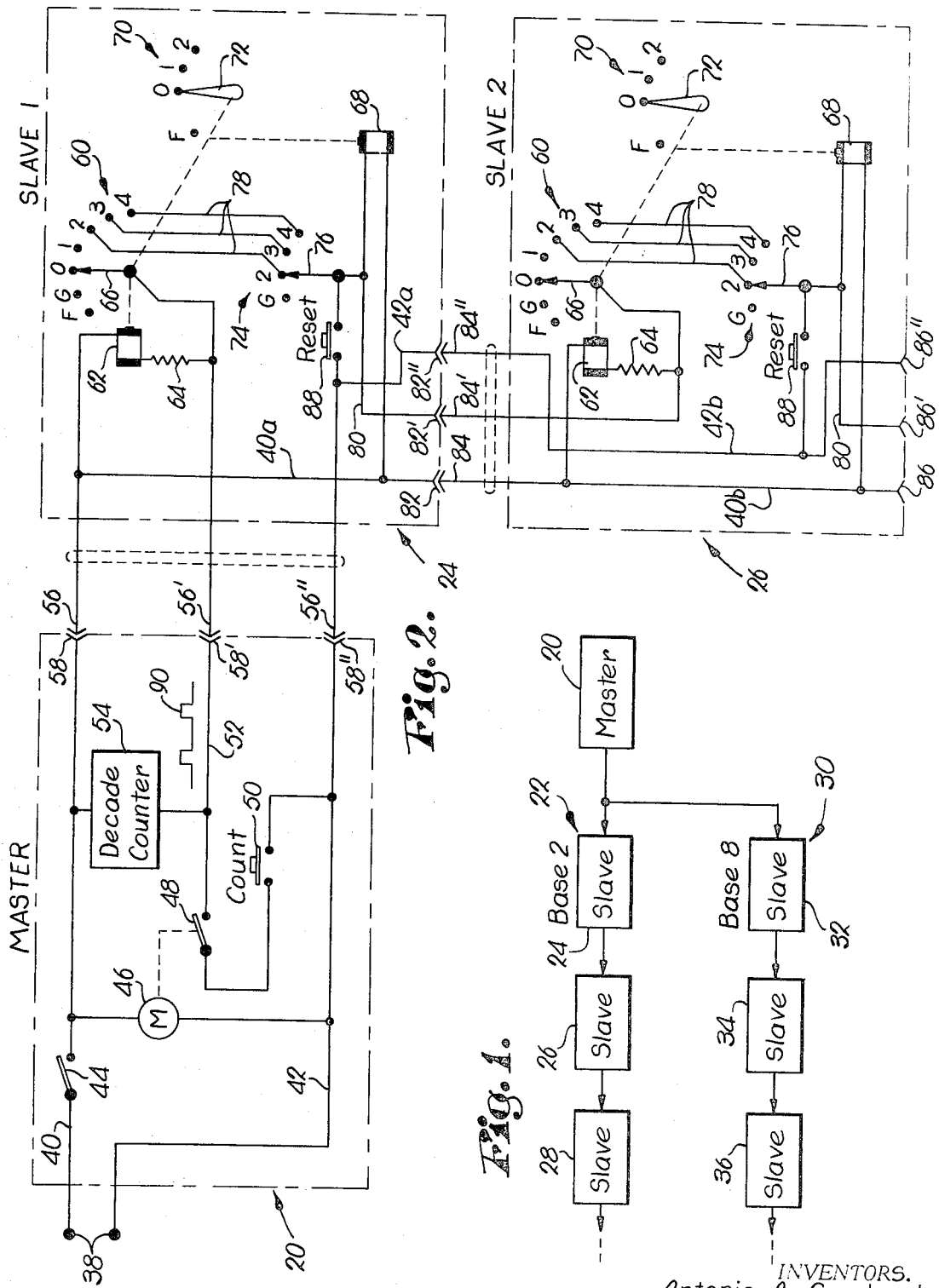
INVENTORS.
Antonio A. Sandoval
Donald J. Dunlavy
BY
Schmidt, Johnson, Hovey & Williams
ATTORNEYS.

ELECTROMECHANICAL BASE CONVERTER

This invention relates to instructional apparatus for familiarizing a student with the manner in which a given number is represented in a number system with which the student is not familiar.

An important object of the present invention is to provide apparatus capable of displaying a number in a selected number system for instructional purposes, wherein the various places of the number are represented by a series of individual modules, each of which indicates the figure in that place of the number, permitting the series to represent as many places as desired in accordance with the number of modules utilized.

As a corollary to the foregoing object, it is an important aim of this invention to provide apparatus as aforesaid which employs a master unit to generate the number to be represented, and wherein said modules comprise slave units responsive to the master unit output, and in which such slave units may be arranged in more than a single series in order to simultaneously represent the number in a plurality of number systems.

Another important object of this invention is to provide apparatus as aforesaid which converts a given number from the base 10 to the base of the selected number system, and which displays such number in both forms in order that the student may readily compare the numerical representations of the two systems.

Still another important object of this invention is to provide apparatus as aforesaid which is of uncomplex design and employs reliable and inexpensive electromechanical components.

Furthermore, it is an important object of the invention to provide such an apparatus in which the number system to be represented may be selected from a number of possible systems through the employment of a straightforward switching arrangement for base selection.

In the drawings:

FIG. 1 is a block diagram of the apparatus showing a master unit and slave unit modules in a two-series arrangement; and FIG. 2 is an electrical schematic diagram of the apparatus, showing a master unit and two slave units.

Referring initially to FIG. 1, a master unit 20 is shown driving a first series of slave units 22 which, as indicated by the legend, represent the places of a base 2 or binary number system. The first slave unit 24 represents the units place and has its input directly connected to the output of the master unit 20. The following slave unit 26 represents the next higher order place and has its input connected to the output of the first slave unit 24. A third slave unit 28 is illustrated and represents the third place of a number in binary form, and has its input connected to the output of the slave unit 26. Accordingly, it is evident that the series of units 22 may be extended by merely adding additional slave units until the number of places are provided corresponding to the desired capacity.

As will be discussed more fully hereinafter, the master unit 20 is controllable by an instructor or student and is operable to deliver a series of count pulses, the number of which correspond to the number to be displayed by the apparatus in a form determined by the selected number system. These pulses delivered by the master unit 20 are counted by the first slave unit 24 and, if sufficient in number to fill the units place, the slave unit 24 resets to zero in response to the next pulse occurring after the units place fills. As the unit 24 resets, it delivers a transfer command at its output which is counted by the second slave unit 26. Again, if the number is of sufficient size to more than fill the second place represented by the slave unit 26, such unit counts the transfer commands successively delivered by the first slave unit 24, ultimately resets to zero after the place fills, and delivers a transfer command at its output that is counted by the next slave unit 28. It is to be understood that each of the slave units of the series 22 displays the stored count so that the figure in each place may be observed by the student. Furthermore, it is desirable to provide the master unit 20 with a decade counter responsive to the count pulses so that the student can also observe the conversion of the number from the base 10 to the base 2 or other base that may be selected.

A second series of slave units 30 is also illustrated in FIG. 1 and includes a first unit 32 representing the units place and two additional units 34 and 36 representing higher order places. As indicated by the legend, the series of units 30 may be set to the base 8 in order to represent the number of count pulses in the octonary system. As discussed above with respect to the series of units 22, the slave units 32, 34 and 36 are connected in series input-to-output connected relationship with the capacity of the series being determined by the number of slave units employed in the series. It should be understood that all of the slave units depicted in FIG. 1 are modules of identical construction, preferably of the plug-in type, with each module being provided with a base selector to permit the student or instructor to select at will the number system to be represented. For proper operation, all of the slave units of a particular series must be set to the same base, as will be appreciated from the detailed description to follow.

Referring to FIG. 2, the master unit 20 is connected to suitable power terminals 38 such as a convenience outlet from which 110 volts AC may be obtained. A pair of power leads 40 and 42 extend from the terminals 38 into the master unit 20, both of these leads being carried to the slave units 24 and 26. The lead 40 is interrupted by an on-off switch 44 which controls an electric motor 46. A single pole cam switch 48 is operated by the shaft of the motor 46, the pole of the switch 48 being connected to the lead 42 through the contacts of a push button count switch 50. A lead 52 is connected to the contact of the cam switch 48, and a solenoid operated decade counter 54 is connected between the power lead 40 and the lead 52.

The first slave unit 24 is provided with a connecting cable that terminates in a plug schematically illustrated at 56, 56', 56''. This plug is received by a female receptacle on the master unit 20 schematically illustrated at 58, 58', 58''.

A stepper relay 60 in the slave unit 24 has an advance coil 62 connected across the plug terminals 56 and 56' through a voltage dropping resistor 64. The armature of the advance coil 62 is mechanically connected to a rotary switch element 66 which is engageable with a series of contacts identified by the characters 0 through 9, and A through G. A reset coil 68 is also mechanically connected to the switch element 66 and, when energized, returns the element 66 to the position thereof illustrated in engagement with the 0 contact.

A dial indicator 70 is diagrammatically illustrated and has a circular dial bearing the characters 0 through 9 and A through F. A dial pointer 72 is rotatable with the switch element 66 and may be directly mounted on the rotor shaft of the stepper switch assembly.

A base selector switch 74 has a manually adjustable rotor 76 engageable with a series of contacts identified by the characters 2 through 9 and A through G. The selector switch 74 is under the control of the instructor or student and thus a knob (not shown) would be provided on the slave module, together with the indicia 2–9 and A–G, to permit the operator to set the switch 74 at any desired position. It should be noted that the contacts of the switch 74 are directly connected by leads 78 to corresponding contacts of the stepper relay 60. The reset coil 68 is connected between the rotor 76 and an extension 40a of the power lead 40.

The output of the first slave unit 24 is presented by lead 80 extending from the rotor 76 of the base selector switch 74. The power lead extension 40a, the lead 80 and the power lead extension 42a terminate at a female receptacle on the module schematically illustrated at 82, 82', 82'', such receptacle receiving a plug 84, 84', 84'' on a connecting cable extending from the second slave module 26. Accordingly, the terminal 84' of the male plug forms the input to the second slave unit and the power connections are continued via the power lead extensions 40b and 42b. Since the construction of the two slave units 24 and 26 is identical, the operating components of the second unit 26 are identified by the same reference numerals used hereinabove in the description of the first unit 24. Note that a female receptacle 86, 86', 86'' is also provided on the second unit 26 to provide a means of connecting the latter to a succeeding slave unit, such as the unit 28 illustrated in FIG. 1. Both of the units 24 and 26 have a push button reset switch 88 for effecting momentary energization of the respective reset coil 68.

OPERATION

FIG. 2 shows in detail the circuit arrangement for representing the units place and the next higher order place of a binary number, the base selector switches 74 of the two slave units 24 and 26 being set to the base 2 as illustrated. Accordingly, for purposes of illustration, operation of the apparatus in converting a number from the base 10 to the base 2 will first be discussed.

With the switch 44 closed the motor 46 in the master unit 20 is in continuous operation, causing repeated closing and opening of the cam switch 48, the latter serving as a mechanical pulser to produce count pulses on the lead 52 as represented by the wave form 90. Such count pulses are not produced, however, unless the count switch 50 is held closed by the operator. The two pulses shown in the wave form 90 are intended to illustrate periods of current conduction from the power lead 42 through the lead 52; manifestly, a DC square wave would not be produced if alternating current is supplied at the power terminals 38.

Each of the pulses is counted by the decade counter 54 and, assuming that the operator wishes to represent the number 2, the count switch 50 is held closed until the decade counter 54 registers 2. The operator, of course, is familiar with the decimal system and thus readily recognizes the readout of the decade counter 54.

The first count pulse fed to the slave unit 24 momentarily energizes the coil 62 to advance the stepper switch element 66 one position where the element 66 engages the 1 contact. The pointer 72 follows and also indicates 1. The second pulse from the master unit 20 initiates a similar action and would cause the switch element 66 to advance to the 2 contact and remain in this position, were it not for the fact that 2 is the base of the number system to be represented, i.e. the number system to which the apparatus is converting the decimal number 2. Since the base selector switch 74 in the slave unit 24 is set in engagement with its 2 contact, the second step of the switch element 66 establishes electrical continuity from the lead 52 through the connector 56', 58', the switch element 66, the lead 78 interconnecting the two 2 contacts, and the rotor 76 to the reset coil 68, causing the switch element 66 to return to the 0 position illustrated. Simultaneously, of course, the pointer 72 of the slave unit 24 also returns to the 0 indication. Since the count pulse is, of course, still maintaining the advance coil 62 energized, the voltage dropping resistor 64 is necessary so that the full voltage applied to the reset coil 68 will cause the armature thereof to mechanically override the advance coil 62 and shift the switch element 66 to the 0 position, in which it remains once excitation is removed by the termination of the pulse.

The action just described above is necessitated since the numeral 1 fills the units place in the binary or base 2 system. Numeric information must be transferred to a higher order place if the number to be represented is greater than can be handled by a particular lower order place. In this instance, therefore, the count is transferred to the second slave unit 26 by virtue of the electrical connection of the rotor 76 in the slave unit 24 with the advance coil 62 in the slave unit 26, via the intervening lead 80 and the connector 82', 84'. Accordingly, the transfer command referred to in the previous discussion of FIG. 1 comprises pulse excitation appearing at the output of a particular slave unit, such excitation causing both the resetting of that slave unit and counting operation of the next succeeding slave unit.

In the foregoing example, it was desired to convert the number 2 to its binary equivalent which is the character 10, the 0 in the units place being displayed by the first slave unit 24 and the 1 in the next higher order place being displayed by the second slave unit 26. This same scheme of operation is employed in the present invention regardless of the settings of the base selector switches 74 and the size of the number to be converted and represented. The particular embodiment illustrated herein has slave units with sufficient number-representing states to accommodate bases from 2 through 16. The figures A, B, C, D, E, F and G are equivalent to 10, 11, 12, 13, 14, 15 and 16 respectively in the decimal system and are used for base 11 through base 16. The dial indicators 70 read only through the figure F, since base G or 16 is the highest base accommodated by the stepper switches and base selector switches illustrated.

Although for purposes of illustrating the concepts of this invention in simplified form a dial indicator 70 has been depicted in the schematic drawing and specifically described above, it is to be understood that in many instances, particularly where classroom demonstration to a number of students is involved, it may be desirable to replace the dial indicator with an equivalent multiple light system to indicate respective numbers. For example, the indicator can be replaced with a rotary switch element mounted on the shaft for rotary switch 66 and adapted to sequentially engage a series of contacts connected to corresponding indicator lights forming a visual number display on the front panel of each slave unit 24. The lights can be positioned in any desired relationship, as for example in circular disposition or linearly, either vertically or horizontally, so that as the rotary indicator switch element is shifted from one light energizing contact to the next, the respective lights are activated in serial order to present a visual change of the number order.

Having thus described the invention, what is claimed as new and desired to be secured by Letters Patent is:

1. Instructional apparatus for representing numbers in a selected number system, said apparatus comprising:
   a master unit for providing a series of count pulses, and having an output and a control operable by a student or instructor for effecting the delivery of a selected number of said pulses at said output; and
   a plurality of slave units representing respective places of the selected number system, and including a first of said slave units representing the units place and a second of said slave units representing the next higher order place,
   said first slave unit being coupled with the output of said master unit for counting each of said pulses and displaying the number thereof counted, and producing a transfer command when the next pulse is counted after the units place fills,
   said second slave unit being coupled with said first slave unit and responsive to said transfer commands for counting the latter and displaying the number thereof counted,
   each of said slave units having means resetting the unit to zero on the next count after the place represented by the unit fills.

2. Apparatus as claimed in claim 1,
   said selected number system being other than the decimal system,
   said master unit being provided with a decade counter responsive to said count pulses for indicating the number thereof delivered at said output, whereby the apparatus converts the number selected by the student from the base 10 to the base of the selected number system.

3. Apparatus as claimed in claim 1,
   the resetting means of said first slave unit operating in response to each of said transfer commands.

4. Apparatus as claimed in claim 1,
   said second slave unit producing a transfer command for a subsequent higher order slave unit when the next transfer command from the first slave unit is counted after the place represented by said second slave unit fills,
   the resetting means of each of said first and second slave units operating in response to each transfer command produced by the respective unit.

5. Apparatus as claimed in claim 1,
   each of said slave units being provided with a base selector operable by the student or instructor for setting the slave unit to the selected number system.

6. Apparatus as claimed in claim 5,
   there being a second plurality of said slave units representing respective places of another selected number system,
   the first slave unit of said second plurality thereof being coupled with the output of said master unit, whereby the same number of said count pulses is represented in two different number systems by the first mentioned plurality and said second plurality of slave units respectively.

7. Apparatus as claimed in claim 1,
   each of said slave units including a stepper relay having a series of contacts corresponding to numbers from zero through the base of the selected number system, a movable switch element engageable with said contacts, electrically responsive operating means coupled with said element for advancing the latter from contact to contact, and said resetting means coupled with said element for returning the latter to the zero contact,
   the operating means of the relay of said first slave unit being connected with the output of said master unit and responsive to said pulses,
   said first slave unit further including circuit means connected with the relay contact thereof corresponding to said base for delivering said transfer command to the operating means of the relay of said second slave unit and to the resetting means of said first slave unit to operate the resetting means,
   said second slave unit further including circuit means connecting the relay contact thereof corresponding to said base with the resetting means of said second slave unit for operation of the resetting means when the switch element engages the last mentioned contact.

8. Instructional apparatus for representing numbers in a selected number system, said apparatus comprising:
   a master unit for providing a series of count pulses, and having an output and a control operable by a student or instructor for effecting the delivery of a selected number of said pulses at said output;
   a plurality of slave units, each of which is provided with an input and an output and represents one place of the selected number system,
   each slave unit having a plurality of number-representing states sequentially assumed in response to pulse excitation received at its input,
   each slave unit delivering a pulse command at its output when the state is reached corresponding to the base of the selected number system, and being further provided with indicator means for displaying the number corresponding to the state thereof;
   means for electrically coupling the input of the lowest order slave unit with the output of the master unit for operation of the lowest order slave unit in response to each of said count pulses; and means for electrically coupling the input of each succeeding higher order slave unit with the output of the preceding slave unit, whereby each higher order slave unit is operated when the preceding slave unit delivers said command, each slave unit having reset means responsive to delivery of said command by the unit for returning the latter to a normal, zero-representing state.

9. Instructional apparatus for representing numbers in a selected number system, said apparatus comprising:

circuitry for providing a series of count pulses, and having an output and a control operable by a student or instructor for effecting the delivery of a selected number of said pulses at said output;

a plurality of stepper relays, including a first and a second stepper relay each having a series of contacts corresponding to numbers from zero through the base of the selected number system, a movable switch element engageable with said contacts, electrically responsive operating means coupled with said element for advancing the element from contact to contact, and electrically responsive reset means coupled with said element for returning the latter to the zero contact, the operating means of said first relay being coupled with the output of said circuitry for advancement of the element of said first relay from contact to contact in response to said pulses;

first indicator means representing the units place of the selected number system and coupled with said first relay for indicating the number corresponding to the contact position of the element thereof;

first circuit means connecting the reset means of said first relay and the operating means of said second relay with the contact of said first relay corresponding to said base;

means coupled with the element of said first relay for delivering electrical excitation thereto to effect energization of said reset means of the first relay and said operating means of the second relay when the element of said first relay engages the contact thereof corresponding to said base, whereby said first relay is reset and the element of said second relay advances one contact position;

second indicator means representing the next higher order place of the selected number system and coupled with said second relay for indicating the number corresponding to the contact position of the element thereof; and second circuit means connecting the reset means of said second relay with the contact thereof corresponding to said base for energization of the last mentioned reset means upon engagement of the element of said second relay with said contact corresponding to said base, whereby to reset said second relay when said higher order place fills.

10. Apparatus as claimed in claim 9, said first circuit means including a first base selector switch having a plurality of contacts connected with corresponding contacts of said first relay, and a switch component selectively engageable with individual contacts of the selector switch to set the units place to the selected number system, said second circuit means including a second base selector switch having a plurality of contacts connected with corresponding contacts of said second relay, and a switch component selectively engageable with individual contacts of the second selector switch to set the higher order place to the selected number system.

11. Apparatus as claimed in claim 9, the switch element of each of said relays including a rotor, each of said indicator means including a pointer mechanically connected with the rotor of the respective relay, and an indicia bearing dial operably associated with said pointer.

* * * * *